May 31, 1966     L. G. S. BROOKER ETAL     3,253,925
SPECTRALLY SENSITIZED SILVER HALIDE EMULSIONS
Original Filed Sept. 2, 1960

FIG. 1
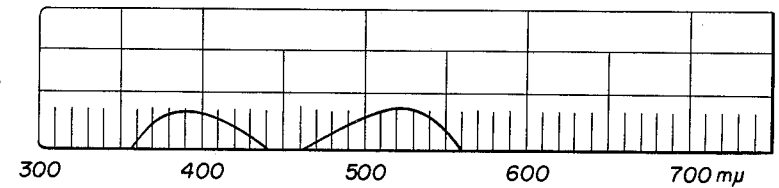
1-DICYANOMETHYLENE-2-[1-METHYL-2(1H)-NAPHTHO-(1,2) THIAZOLYLIDENE] INDAN FIG. 2
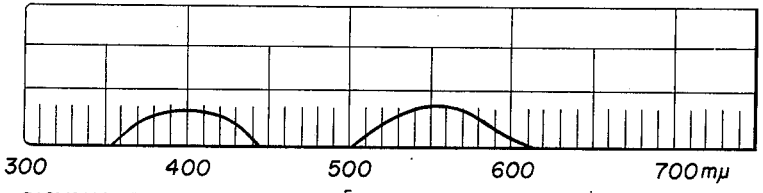
2-DICYANOMETHYLENE-1,3-DI[3-METHYL-2(3H)-BENZOTHIAZOLYLIDENE] INDAN FIG. 3
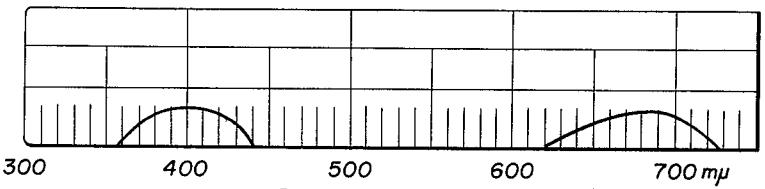
2-DICYANOMETHYLENE-1-[(3-ETHYL-2(3H)-BENZOTHIAZOLYLIDENE) ETHYLIDENE]-3-[(3-ETHYL-2(3H)-BENZOXAZOLYLIDENE) ETHYLIDENE] INDAN

LESLIE G. S. BROOKER
FRANK G. WEBSTER
INVENTORS

BY R. Frank Smith
Ray Carter Livermon
ATTORNEY AND AGENT 3,253,925
SPECTRALLY SENSITIZED SILVER HALIDE
EMULSIONS
Leslie G. S. Brooker and Frank G. Webster, Rochester, N.Y., assignors to Eastman Kodak Company, Rochester, N.Y., a corporation of New Jersey
Continuation of application Ser. No. 53,698, Sept. 2 1960, now Patent No. 3,194,805, dated July 13, 1965. This application Apr. 23, 1965, Ser. No. 450,598
15 Claims. (Cl. 96—105)

This invention relates to holopolar cyanine dyes, a method for preparing such dyes and photographic silver halide emulsions spectrally sensitized with such dyes.

This is a continuing application of Brooker and Webster U.S. Serial No. 53,698 filed September 2, 1960 now U.S. Patent No. 3,194,805.

It is, therefore, an object of our invention to provide new holopolar cyanine dyes. Another object is to provide new holopolar cyanine dyes having different absorbing characteristics from other holopolar cyanine dyes previously described in the photographic art. Still another object is to provide photographic silver halide emulsions spectrally sensitized with the new holopolar cyanine dyes of our invention. Other objects will become apparent from a consideration of the following description and examples.

The new spectral sensitizing dyes of our invention include holopolar cyanine dyes represented by the following two general formulas:

I.

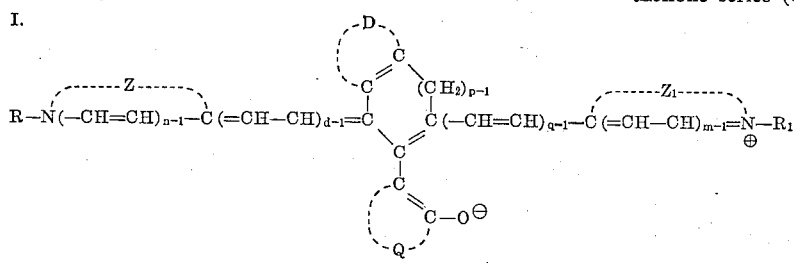

and

II.

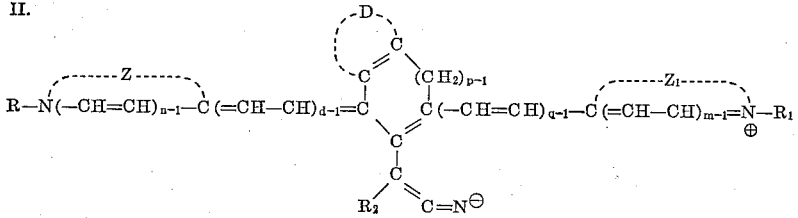

wherein R and $R_1$ each represents a substituted or unsubstituted alkyl group (e.g., methyl, ethyl, n-propyl, n-butyl, isobutyl, n-amyl, isoamyl, β-methoxyethyl, β-ethoxyethyl, allyl (i.e., vinylmethyl), benzyl (phenylmethyl), β-phenylethyl, carboxymethyl, β-carboxyethyl, β-sulfoethyl, γ-sulfopropyl, γ-sulfobutyl, sulfobutyl, etc.) (especially alkyl groups containing from 1 to 4 carbon atoms), $R_2$ represents a cyano group or an alkoxycarbonyl group (methoxycarbonyl, ethoxycarbonyl, etc., especially a lower alkoxycarbonyl group), $n$, $m$ and $p$ each represents a positive integer of from 1 to 2, $d$ and $q$ each represents a positive integer of from 1 to 3, D represents the atoms necessary to complete a benzene ring (which can be substituted, for example, by chlorine, bromine, hydroxyl, methoxyl, ethoxyl, methyl, ethyl, etc.), Q represents the non-metallic atoms necessary to complete a nucleus of the indandione series (e.g., 1,3-diketohydrindene, etc.) or a heterocyclic nucleus containing from 5 to 6 atoms in the heterocyclic ring, such as those of the pyrazolone series (e.g., 3-methyl-1-phenyl-5-pyrazolone, 1-phenyl-5-pyrazolone, 1-(2-benzothiazolyl)-3-methyl-5-pyrazolone, etc.), those of the isoxazolone series (e.g., 3-phenyl-5(4H)-isoxazolone, 3-methyl-5(4H)-isoxazolone, etc.), those of the oxindole series (e.g., 1-alkyl-2,3-dihydro-2-oxindoles, etc.), those of the 2,4,6-triketohexahydropyrimidine or 2-thio-4,6-diketohexahydropyrimidine series (e.g., barbituric acid or 2-thiobarbituric acid) as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-diisopropyl, 1,3-dicyclohexyl, 1,3-di(β-methoxyethyl), etc.), or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl, etc.), or 1-alkyl-3-aryl (e.g., 1-ethyl-3-phenyl, 1-n-heptyl-3-phenyl, etc.) derivatives, those of the rhodanine series (i.e., 2-thio-2,4-thiazolindinedione series), such as rhodanine, 3-alkylrhodanines (e.g., 3-ethylrhodanine, 3-allylrhodanine, etc.) or 3-arylrhodanines (e.g., 3-phenylrhodanine, etc.), etc., those of the 2(3H)-imidazol[1,2-a]pyridone series, those of the 5,7-dioxo-6,7-dihydro-5-thiazolo[3,2-a]pyrimidine series (e.g., 5,7-dioxo-3-phenyl-6,7-dihydro-5-thiazolo[3,2-a]pyrimidine, etc.), those of the 2-thio-2,4-oxazolidinedione series (i.e., those of the 2-thio 2,4-(3H,5H)-oxazoledione series) e.g., 3-ethyl-2-thio-2,4-oxazolidinedione, etc.), those of the thianaphthenone series (e.g., 3(2H)-thianaphthenone, etc.), those of the 2-thio-2,5-thiazolidinedione series (i.e., the 2-thio-2,5(3H,4H)-thiazoledione series) (e.g., 3-ethyl-2-thio-2,5-triazolidinedione, etc.), those of the 2,4-thiazolidinedione series (e.g., 2,4-thiazolidinedione, 3-ethyl-2,4-thiazolidinedione, 3-phenyl-2,4-thiazolidinedione, 3-α-naphthyl-2,4-thiazolidinedione, etc.), those of the thiozolidinone series (e.g., 4-thiazolidinone, 3-ethyl-4-thiazolidinone, 3-phenyl-4-thiazolidinone, 3-α-naphthyl-4-thiazolidinone, etc.), those of the 4-thiazolinone series (e.g., 2-ethylmercapto-4-thiazolinone, 2-alkylphenylamino-4-thiazolinones, 2-diphenylamino-4-thiazolinone, etc.), those of the 2-imino-2,4-oxazolinone (i.e., pseudohydantoin) series, those of the 2,4-imidazolinedione (hydantoin) series (e.g., 2,4-imidazolinedione, 3-ethyl-2,4-imidazolinedione, 3-phenyl-2,4-imidazolinedione, 3-α-naphthyl-2,4-imidazolinedione, 1,3-diethyl-2,4-imidazolinedione, 1-ethyl-3-α-naphthyl-2,4-imidazolinedione, 1,3-diphenyl-2,4-imidazolinedione, etc.), those of the 2-thio-2,4-imidazolinedione (i.e., 2-thiohydantoin) series (e.g., 2-thio-2,4-imidazolinedione, 3-ethyl-2-thio-2,4-imidazolinedione, 3-phenyl-2-thio-2,4-imidazolinedione, 3-α-naphthyl-2-thio-2,4-imidazolinedione, 1,3-diethyl-2-thio-2,4-imidazolinedione, 1-ethyl-3-phenyl-2-thio-2,4-imidazolinedione, 1-ethyl - 3 - α - naphthyl - 2 - thio - 2,4 - imidazolinedione, 1,3-diphenyl-2-thio-2,4-imidazolinedione, etc.), those of the 5-imidazolinone series (e.g., 2-n-propylmercapto-5-imidazolinone, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom), and Z and $Z_1$ each represents the non-metallic atoms necessary to complete a heterocyclic nucleus containing from 5 to 6 atoms in the heterocyclic ring, such as those selected from the group consisting of those of the thiazole series (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., naphtho[1,2]thiazole, naphtho[2,1]thiazole, 5 - methoxynaphtho[2,1]thiazole, 5 - ethoxynaphtho[2,1]thiazole, 8 - methoxynaphtho[1,2]thiazole, 7-methoxynaphtho[1,2]thiazole, etc.), those of the thianaphtheno-7',6',4,5-thiazole series (e.g., 4'-methoxythianaphtheno-7',6',4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g., naphtho[1,2]oxazole, naphtho-[2,1]oxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., naphtho[1,2]selenazole, naphtho[2,1]selenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3-isoquinoline series (e.g., isoquinoline, etc.), those of the benzimidazole series (e.g., 1,3-diethylbenzimidazole, 1,3 - diethyl - 5 - chlorobenzimidazole, 1,3 - diethyl -5,6-dichlorobenzimidazole, 1 - ethyl - 3 - phenylbenzimidazole, etc.), those of the 3,3-dialkylindolenine series (e.g., 3,3-dimethylindolenine, 3,3,5-trimethylindolenine, 3,3,7-trimethylindolenine, etc.), those of the 2-pyridine series (e.g., pyridine, 5-methylpyridine, etc.), those of the 4-pyridine series (e.g., pyridine, etc.), etc.

We have also found that photographic silver halide emulsions can be usefully sensitized by incorporating therein at least one merocyanine dye selected from those represented by the following two general formulas:

III.

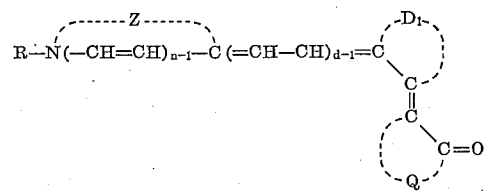

and

IV.

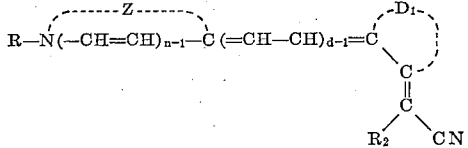

wherein R, $R_2$, n, d, Q and Z each have the values given above, and $D_1$ represents the atoms necessary to complete an indan or 1,2,3,4-tetrahydronaphthalene ring (which can have substituents on the benzene ring thereof, such as those identified above under D).

The merocyanine dyes represented by Formula III above can advantageously be prepared by condensing a compound selected from those represented by the following formula:

V.

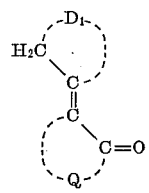

wherein $D_1$ and Q each have the values given above, with one molecule of a cyclammonium quaternary salt selected from those represented by the following general formula:

VI.

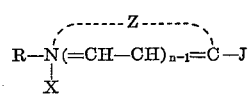

wherein R, Z and n each have the values given above, X represents an acid anion, such as chloride, bromide, iodide, perchlorate, thiocyanate, benzenesulfonate, p-toluenesulfonate, methylsulfate, ethylsulfate, etc., and J represents an electronegative group such as VIa.         

wherein $R_3$ represents an alkyl group (e.g., methyl, ethyl, etc.), or an aryl group (e.g., phenyl, tolyl, etc.), or VIb.

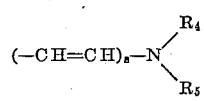

wherein s represents a positive integer of from 1 to 2, $R_4$ represents an acyl group (e.g., acetyl, propionyl, butyryl, benzoyl, etc.) and $R_5$ represents an aryl group (e.g., phenyl, tolyl, etc.).

The merocyanine dyes of Formula IV above can advantageously be prepared by condensing a compound selected from those represented by the following general formula:

VII.

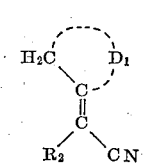

with one molecule of a cyclammonium quaternary salt selected from those represented by Formula VI above.

The holopolar cyanine dyes represented by Formula I above can be prepared by condensing a merocyanine dye selected from those represented by Formula III with a cyclammonium quaternary salt represented by Formula VI. This method of preparation is capable of yielding symmetrical (Z and $Z_1$ are identical) or unsymmetrical (Z and $Z_1$ are different) dyes.

The holopolar cyanine dyes of Formula II can be prepared by condensing a merocyanine dye of Formula IV with a cyclammonium quaternary salt selected from those represented by Formula VI. Likewise, this method of preparation is capable of yielding both symmetrical and unsymmetrical dyes.

Symmetrical holopolar cyanine dyes included within the scope of Formula I can likewise be prepared by condensing one molecule of a compound of Formula V with two molecules of a cyclammonium quaternary salt represented by Formula VI. In like manner, symmetrical holopolar cyanine dyes of the type included within Formula II can be prepared by condensing one molecule of an intermediate of the type represented by Formula VII with two molecules of a cyclammonium quaternary salt of the type represented by Formula VI.

The condensations of the compounds of Formula V with those of Formula VI and the condensations of the compounds of Formula VII with those of Formula VI can be accelerated by basic condensing agents, such as trialkylamines (e.g., triethylamine, tri-n-propylene, triisopropylamine, tri-n-butylamine, etc.), N,N-dialkylanilines (e.g., N,N-dimethylaniline, N,N-diethylaniline, etc.), N-alkylpiperidines (e.g., N-methylpiperidine, N-ethylpiperidine, etc.), etc. The condensations can also be carried out in the presence of an inert diluent (depending somewhat on the solubility of the intermediates in the diluent), such as the lower alcohols (e.g., ethanol, n-propanol, isopropanol, n-butanol, etc.), pyridine, quinoline, isoquinoline, 1,4-dioxane, etc. Basic diluents, such as pyridine, quinoline, isoquinoline, etc., are especially useful. Heat accelerates the condensations, although it has been found that temperatures varying from ambient (ca. 25° C.) to the reflux temperature of the reaction mixture can be employed.

The intermediates of Formula V above can advantageously be prepared by condensing a compound selected from those represented by the following general formula:

VIII.

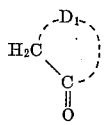

wherein $D_1$ has the values given above, with an intermediate of the following general formula:

IX.

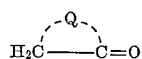

wherein Q has the values given above.

The intermediates of Formula VII above can advantageously be prepared by condensing a compound represented by Formula VIII with a compound represented by the following general formula:

X.

wherein $R_2$ has the values given above.

The condensations of the compounds of Formula VIII with those of Formula IX or X can advantageously be carried out in the presence of a mixture of ammonium acetate and acetic acid. Generally, an inert diluent, such as chloroform, diethyl ether, etc. can be employed. Heat accelerates the condensations although temperatures varying from room temperature to about the refluxing temperature of the reaction mixture can be employed.

In preparing the merocyanine dyes of Formula III and those of Formula IV, it is apparent that the intermediates of Formulas V and VII need have only one reactive methylene group, as indicated in the formulas. However, in preparing the holopolar dyes of Formula I and Formula II, it is apparent that the intermediates of Formula V and Formula VII must have two reactive methylene groups. Intermediates of Formula V having two reactive methylene groups can be represented by the following general formula:

XI.

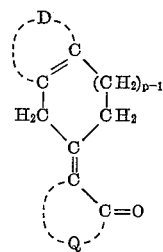

wherein D, Q and p each have the values give above. The intermediates of Formula VII having two reactive methylene groups can be represneted by the following general formula:

XII.

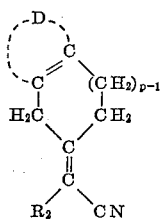

wherein $R_2$, D and p each have the values given above.

The following list includes examples of typical intermediates, and typical dyes of our invention (made from the said intermediates) that are used to advantage in sensitizing photographic silver halide emulsions. Examples 1 through 5 illustrate intermediates while Examples 6 through 32 illustrate the dyes.

Example: Compound
1 ____ 1-dicyanomethyleneindan.
2 ____ 2-dicyanomethyleneindan.
3 ____ 1,3-diethyl - 5 - (indan-2-ylidene)barbituric acid.
4 ____ 1 - dicyanomethylene - 1,2,3,4 - tetrahydronaphthalene.
5 ____ 2 - dicyanomethylene - 1,2,3,4 - tetrahydronaphthalene.
6 ____ 1-dicyanomethylene-2 - (3 - methyl-2(3H) benzothiazolylidene)indan.
7 ____ 1-dicyanomethylene-2-[(3 - ethyl - 2(3H) benzothiazolylidene)ethylidene]indan.
8 ____ 1-dicyanomethylene-2-[(3 - ethyl - 2(3H) benzothiazolylidene) - 2 - butenylidene] indan.
9 ____ 1-dicyanomethylene-2-(3 - methyl - 2(3H) benzoxazolylidene)indan.
10 ____ 1-dicyanomethylene-2-(1 - methyl - 2(1H) naphtho[1,2-]-thiazolylidene)indan.
11 ____ 1-dicyanomethylene-2-(1 - ethyl - 2(1H) quinolylidene)-indan.
12 ____ 1-dicyanomethylene-2-[(1 - ethyl - 2(1H) naphtho[1,2] - thiazolylidene)isoproplyidene]indan.
13 ____ 2 - dicyanomethylene-1-(3-ethyl-2(3H)benzothiazolylidene)indan.
14 ____ 2-dicyanomethylene-1-[(3 - ethyl - 2(3H) benzothiazolylidene)ethylidene]indan.

Example: Compound
15 ---- 2-dicyanomethylene-1-[(3 - ethyl - 2(3H) benzothiazolylidene) - butenylidene] indan.
16 ---- 2-dicyanomethylene-1-[(3 - ethyl - 2(3H) benzoxazolylidene)ethylidene]indan.
16A -- 2-dicyanomethylene-,3 - di[(3 - ethyl - 2- (3H)benzothiazolylidene) indan.
17 ---- 2-dicyanomethylene-1,3 - di[(3 - ethyl - 2 (3H)benzothiazolylidene)ethylidene] indan.
18 ---- 2-dicyanomethylene-1,3 - di[3 - ethyl - 2 (3H)-benzothiazolylidene) - 2 - butenylidene]indan.
19 ---- 2-dicyanomethylene-1-[(3 - ethyl - 2(3H) benzothiazolylidene) - 2 - butenylidene]-3-[(3-ethyl - 2(3H)-benzothiazolylidene) ethylidene]-indan.
20 ---- 2-dicyanomethylene-1-[3 - ethyl - 2(3H) benzothiazolylidene)ethylidene] - 3- [(3 - ethyl-2(3H)benzoxazolylidene)ethylidene]indan.
21 ---- 1,3-diethyl - 5 - [1,3-di(3-methyl-2(3H) zothiazolylidene)indan - 2 - ylidene]barbituric acid.
22 ---- 1,3-diethyl - 5 - [1,3-di(3-methyl-2(3H) benzothiazolylidene)indan - 2 - ylidene] barbituric acid.
23 ---- 1,3-diethyl-5 - {[1,3-di(3-ethyl-2(3H)benzothiazolylidene)ethylidene)ethylidene] indan-2-ylidene}barbituric acid.
24 ---- 1,3-diethyl-5-{[1,3 - di(3 - ethyl - 2(3H) benzoxazolylidene)ethylidene]indan-2-ylidene}barbituric acid.
25 ---- 1,3-diethyl-5 - [1,3 - di(1-methyl - 2(1H) naphtho[1,2]thiazolylidene)indan - 2-ylidene]barbituric acid.
26 ---- 1,3-diethyl - 5 - {1-[(3-ethyl-2(3H)benzothiazolylidene)-2 - butadienylidene] - 3- (3-methyl-2 - (3H)benzothiazolylidene) indan-2-ylidene}barbituric acid.
27 ---- 1,3-diethyl-5-[1-(3 - methyl - 2(3H)benzothiazolylidene)-3 - (1 - methyl - 2(1H) naphtho[1,2]thiazolylidene)indan - 2-ylidene]barbituric acid.
28 ---- 1-dicyanomethylene-1,2,3,4 - tetrahydro-2- (3-methyl - 2(3H)benzothiazolylidene) naphthalene.
29 ---- 1-dicyanomethylene-1,2,3,4 - tetrahydro-2- (1-methyl-2(1H)naphtho[1,2]thiazolylidene)naphthalene.
30 ---- 1-dicyanomethylene - 2 - (1-ethyl-2-(1H) quinolylidene)-1,2,3,4 - tetrahydronaphthalene.
31 ---- 1-dicyanomethylene - 2 - [(3-ethyl-2-(3H) benzoxazolylidene)ethylidene] - 1,2,3,4-tetrahydronaphthalene.
32 ---- 1-dicyanomethylene - 1,2,3,4-tetrahydro-2- [(3-methyl - 2(3H)benzothiazolylidene) ethylidene]naphthalene.

Portions of the indicated gelatino-silver-halide emulsions were sensitized with illustrative dyes of our invention, and coated on a cellulose acetate support. The coatings were given spectrophotometric exposures and processed in the usual way to determine the wavelength of light to which they were sensitive and to which they had maximum sensitivity ($D_{max}$). The values are listed in the following table.

| Dye of Example No. | Type of Emulsion | Sensitivity Range in $m\mu$ | Sensitivity Maximum in $m\mu$ |
|---|---|---|---|
| 6 | Silver-bromoiodide | 565 | 545 |
| 7 | ----do---- | 680 | 660 |
| 9 | ----do---- | 510 | 490 |
| 10 | ----do---- | 575 | 550 |
| 16A | ----do---- | 610 | 565 |
| 17 | ----do---- | 780 | 690 |
| 18 | Silver-chlorobromide | 690 | 630 |
| 19 | Silver-bromoiodide | 840 | 810 |
| 20 | ----do---- | 730 | 685 |
| 23 | ----do---- | 770 | 750 |
| 24 | ----do---- | 720 | 680 |
| 25 | ----do---- | 620 | 590 |
| 26 | ----do---- | 810 | 730 |
| 27 | ----do---- | 575 | 555 |
| 28 | ----do---- | 555 | |
| 29 | ----do---- | 580 | 555 |
| 31 | ----do---- | 690 | 600 |
| 32 | ----do---- | 690 | 580 |

The dye of Example No. 12 sensitized a gelatino-silver-bromoiodide emulsion.

We have found that the intermediates of Formula V or Formula VII can be condensed with intermediates of the type represented by Formula V in column 3 of Heseltine and Brooker U.S. Patent 2,927,026, issued March 1, 1960, to provide merocyanine dyes corresponding to those of Formula III and Formula IV, wherein $d$ is 2 wherein the methine group contiguous to the ring represented by $D_1$ contains a substituent, such as alkyl (e.g., methyl, ethyl, propyl, etc.), or aryl (e.g., phenyl, tolyl, etc.). Where this alkyl group is methyl, it remains reactive and can be reacted with a second molecule of an intermediate of Formula V of U.S. Patent 2,927,026 to provide complex holopolar dyes. The preparation of a merocyanine dye corresponding to those of Formula IV above, wherein $d$ is 2 and the methine chain contains a methyl substituent, is given in Example 12 above. As indicated in Example 12, the dyes thus obtained can also be usefully employed to sensitize photographic silver halide emulsions. Similar dyes corresponding to those of Formula III, wherein $d$ is 2 and the intracyclic chain contains a substituent can be prepared using the general method of Example 12.

The detailed preparation of intermediates of Examples 1 through 5 and the dyes of Examples 6 through 32 is described in Brooker and Webster U.S. Serial No. 53,698 filed September 2, 1960, now U.S. Patent No. 3,194,805, from which the present application is a continuing application. The example (number) describing a given intermediate or dye is the same in each application.

It will be noted that the dyes of our invention represented by Formula I and II have been named in their uncharged state, although the formulas have been written in the charged form. It is possible, of course, to write the structures of these days in an uncharged state, for example, as follows (for Formula I):

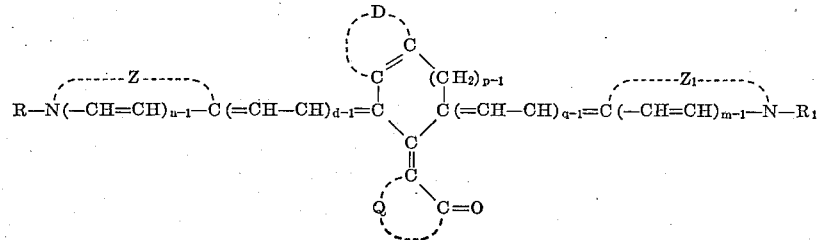

wherein R, R₁, d, m, n, p, q, D, Q, Z and Z₁ each have the values given above. While the above structure represents a non-ionic representation of the dye of Formula I, it is possible to assign a related structure to the dyes of Formula II.

As shown in the above examples, many of the dyes of our invention are particularly useful in manufacturing photographic, silver halide emulsions, serving to alter the sensitivity thereof. Sensitization by means of our new dyes is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine has proven satisfactory as a solvent for the majority of our new dyes.

The concentration of our new dyes in the emulsion can vary widely, i.e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents 2,540,085, 2,597,856 and 2,597,915), various palladium compounds, such as palladium chloride (U.S. 2,540,086), potassium chloropalladate (U.S. 2,598,079), etc., or mixtures of such sensitizers; antifoggants, such as ammonium chloroplatinate (U.S. 2,566,245), ammonium chloroplatinite (U.S. 2,566,263), benzotriazole, nitrobenzimidazole, 5-nitroindazole, benzidine, mercaptans, etc. (see Mees—"The Theory of the Photographic Process," Macmillan Pub., 1942, page 460), or mixtures thereof; hardeners, such as formaldehyde (U.S. 1,763,-533), chrome alum (U.S. 1,763,533), glyoxal (U.S. 1,870,-354), dibromacrolein (British 406,750), etc.; color couplers, such as those described in U.S. Patent 2,423,730, Spence and Carroll U.S. Patent 2,640,776, etc.; or mixtures of such addenda. Dispersing agents for color couplers, such as those set forth in U.S. Patents 2,322,027 and 2,304,940, can also be employed in the above-described emulsions.

The merocyanine and holopolar dyes of our invention have unique sensitizing properties in that maximum absorption is shifted bathochromically about 100 millimicrons as compared with similar dyes having no arylenechain substitution. This unique effect is illustrated in FIGURES 1–3 of the accompanying drawing.

The accompanying drawing illustrates the sensitizing effect obtained with three of our novel spectral sensitizing dyes in gelatino-silver-bromoiodide or chlorobromide emulsions. The solid line in each figure of the drawing is a diagrammatic reproduction of one spectrogram. The inherent sensitivity of the emulsion is within the region of about 400 millimicrons and the sensitivity contributed by the sensitizing dye is represented by the right-hand portion of the solid curve.

In FIGURE 1, the solid curve represents the sensitivity of an ordinary gelatino-silver-chlorobromide emulsion sensitized with 1 - dicyanomethylene - 2-(1-methyl-2(1H)-naphtho[1,2]thiazolylidene)indan, the dye of Example 10.

In FIGURE 2, the solid curve represents the sensitivity of an ordinary gelatino-silver-chlorobromide emulsion sensitized with 2 - dicyanomethylene - 1,3 - di(3-methyl-2-(3H)-benzothiazolylidene)indan, the dye of Example 16A.

In FIGURE 3, the solid curve represents the sensitivity of an ordinary gelatino-silver-bromoiodide emulsion sensitized with 2-dicyanomethylene-1-[(3-ethyl-2(3H)-benzothiazolylidene) - ethylidene] - 3-[(3-ethyl-2(3H)-benzoxazolylidene)ethylidene]indan, the dye of Example 20.

The invention has been described in detail with particular reference to preferred embodiments thereof, but it will be understood that variations and modifications can be effected within the spirit and scope of the invention as described hereinabove and as defined in the appended claims.

We claim:

1. A photographic silver halide emulsion sensitized with a holopolar cyanine dye selected from those represented by the following two general formulas:

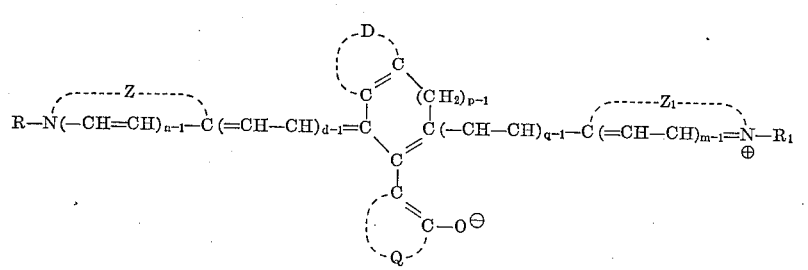

and

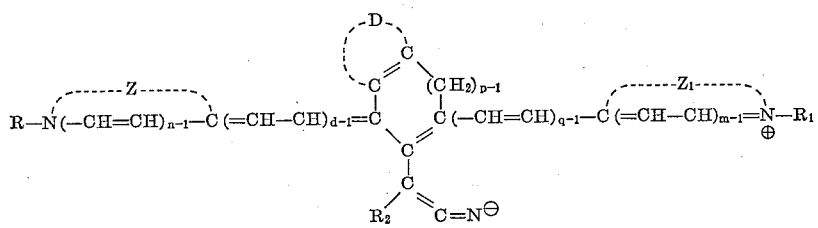

wherein R and $R_1$ each represents an alkyl group, $R_2$ represents a member selected from the class consisting of a cyano group and an alkoxycarbonyl group, $d$ and $q$ each represents a positive integer of from 1 to 3, $m$, $n$ and $p$ each represents a positive integer of from 1 to 2, D represents the atoms necessary to complete a benzene ring, Q represents the non-metallic atoms necessary to complete a nucleus selected from the class consisting of those of the indandione series and a heterocyclic nucleus containing from 5 to 6 atoms in the heterocyclic ring and Z and $Z_1$ each represents the non-metallic atoms necessary to complete a heterocyclic nucleus containing from 5 to 6 atoms in the heterocyclic ring.

2. A photographic gelatino-silver-halide emulsion sensitized with a holopolar cyanine dye selected from those represented by the following general formula:

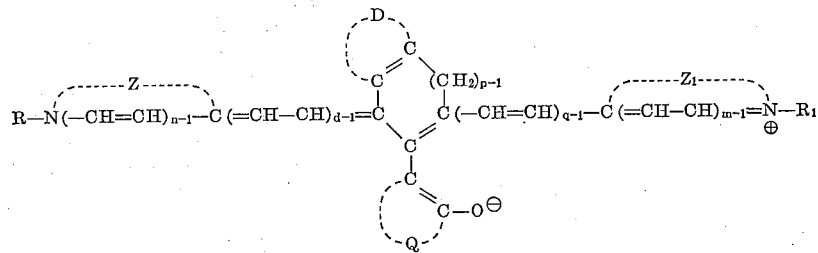

wherein R and $R_1$ each represents an alkyl group containing from 1 to 4 carbon atoms, $d$ and $q$ each represents a positive integer of from 1 to 3, $m$, $n$ and $p$ each represents a positive integer of from 1 to 2, D represents the atoms necessary to complete a benzene ring, Q represents the non-metallic atoms necessary to complete a heterocyclic nucleus selected from the class consisting of those of the pyrazolone series, those of the rhodanine series, those of the 2-thiohydantoin series, those of the 2-thio-2,4-oxazolidinedione series, those of the 2,4,6-triketohexahydropyrimidine series and those of the 2-thio-4,6-diketohexahydropyrimidine series, and Z and $Z_1$ each represents the non-metallic atoms necessary to complete the heterocyclic nucleus selected from the class consisting of those of the thiazole series, those of the benzothiazole series, those of the naphthothiazole series, those of the benzoxazole series, those of the naphthoxazole series, those of the benzoselenazole series, those of the naphthoselenazole series, those of the 2-quinoline series, and those of 4-quinoline series.

3. A photographic gelatino-silver-halide emulsion sensitized with a holopolar cyanine dye selected from those represented by the following general formula:

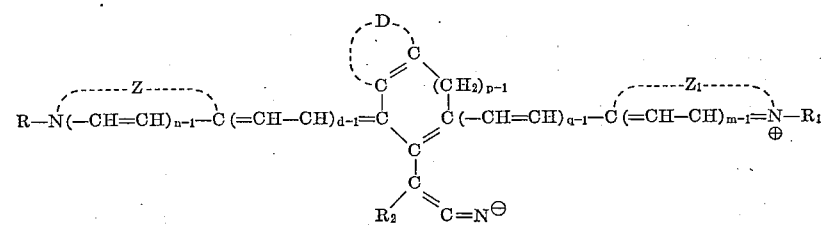

wherein R and $R_1$ each represents an alkyl group containing from 1 to 4 carbon atoms, $R_2$ represents a member selected from the class consisting of a cyano group and an alkoxycarbonyl group containing from 2 to 3 carbon atoms, $d$ and $q$ each represents a positive integer of from 1 to 3, $m$, $n$ and $p$ each represents a positive integer of from 1 to 2, D represents the atoms necessary to complete a benzene ring, and Z and $Z_1$ each represents the non-metallic atoms necessary to complete a heterocyclic nucleus selected from the class consisting of those of the thiazole series, those of the benzothiazole series, those of the naphthothiazole series, those of the benzoxazole series, those of the naphthoxazole series, those of the benzoselenazole series, those of the naphthoselenazole series, those of the 2-quinoline series, and those of the 4-quinoline series.

4. A photographic gelatino-silver-halide emulsion sensitized with a merocyanine dye selected from those represented by the following general formula:

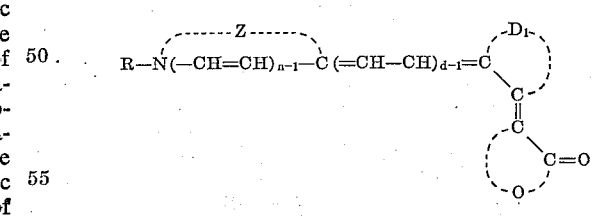

wherein R represents an alkyl group containing from 1 to 4 carbon atoms, $d$ represents a positive integer of from 1 to 3, $n$ represents a positive integer of from 1 to 2, $D_1$ represents the atoms necessary to complete a ring selected from the class consisting of an indan ring and a 1,2,3,4-tetrahydronaphthalene ring, Q represents the non-metallic atoms necessary to complete a heterocyclic nucleus selected from the class consisting of those of the pyrazolone series, those of the rhodanine series, those of the 2-thiohydantoin series, those of the 2-thio-2,4-oxazolidinedione series, those of the 2,4,6-triketohexahydropyrimidine series and those of the 2-thio-4,6-diketohexahydropyramidine series and Z represents the non-metallic atoms necessary to complete a heterocyclic nucleus of the class consisting of those of the thiazole series, those of the benzothiazole series, those of the naphthothiazole series, those of the benzoxazole series, those of the naphthoxazole series, those of the benzoselenazole series, those of the naphthoselenazole series, those of the 2-quinoline series, and those of the 4-quinoline series.

5. A photographic gelatino-silver-halide emulsion sensitized with a merocyanine dye selected from those represented by the following general formula:

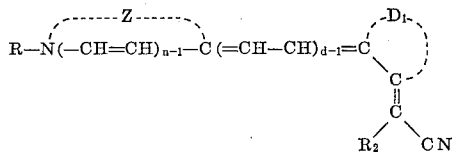

wherein R represents an alkyl group containing from 1 to 4 carbon atoms, $R_2$ represents a member selected from the class consisting of a cyano group and an alkoxycarbonyl group containing from 2 to 3 carbon atoms, $d$ represents a positive integer of from 1 to 3, $n$ represents a positive integer of from 1 to 2, $D_1$ represents the atoms necessary to complete a ring selected from the class consisting of an indan ring and a 1,2,3,4-tetrahydronaphthalene ring, Z represents the non-metallic atoms necessary to complete a heterocyclic nucleus selected from the class consisting of those of the thiazole series, those of the benzothiazole series, those of the naphthothiazole series, those of the benzoxazole series, those of the naphthoxazole series, those of the benzoselenazole series, those of the naphthoselenazole series, those of the 2-quinoline series, and those of the 4-quinoline series.

6. A photographic gelatino-silver halide emulsion sensitized with a holopolar cyanine dye selected from those represented by the following general formula:

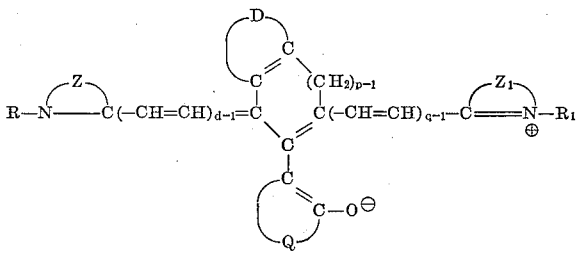

wherein R and $R_1$ each represents an alkyl group containing from 1 to 4 carbon atoms, $d$ and $q$ each represents a positive integer of from 1 to 3, $p$ represents a positive integer of from 1 to 2, D represents the atoms necessary to complete a benzene ring, Q represents the non-metallic atoms necessary to complete a heterocyclic nucleus selected from the class consisting of those of the pyrazolone series, those of the rhodanine series, those of the 2-thiohydantoin series, those of the 2-thio-2,4-oxazolidinedione series, those of the 2,4,6-triketohexahydropyramidine series and those of the 2-thio-4,6-diketohexahydropyrimidine series, and Z and $Z_1$ each represents the non-metallic atoms necessary to complete a heterocyclic nucleus of the benzothiazole series.

7. A photographic gelatino-silver-halide emulsion sensitized with a holopolar cyanine dye selected from those represented by the following general formula:

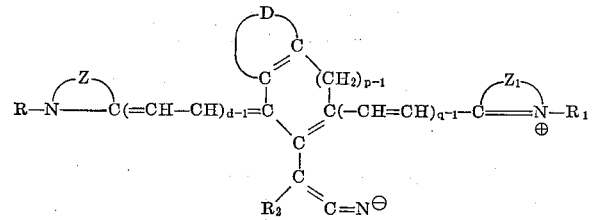

wherein R and $R_1$ each represents an alkyl group containing from 1 to 4 carbon atoms, $R_2$ represents a member selected from the class consisting of a cyano group and an alkoxycarbonyl group containing from 2 to 3 carbon atoms, $d$ and $q$ each represents a positive integer of from 1 to 3, $p$ represents a positive integer of from 1 to 2, D represents the atoms necessary to complete a benzene ring, and Z and $Z_1$ each represents the non-metallic atoms necessary to complete a heterocyclic nucleus of the benzothiazole series.

8. A photographic gelatino-silver-halide emulsion sensitized with a holopolar cyanine dye selected from those represented by the following general formula:

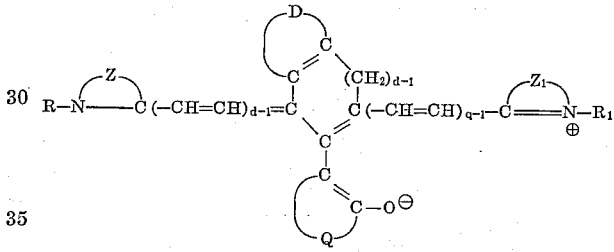

wherein R and $R_1$ each represents an alkyl group containing from 1 to 4 carbon atoms, $d$ and $q$ each represents a positive integer of from 1 to 3, $p$ represents a positive integer of from 1 to 2, D represents the atoms necessary to complete a benzene ring, Q represents the non-metallic atoms necessary to complete a heterocyclic nucleus selected from the class consisting of those of the pyrazolone series, those of the rhodanine series those of the 2-thiohydantoin series, those of the 2-thio-2,4-oxazolidinedione series, those of the 2,4,6-triketohexahydropyrimidine series and those of the 2-thio-4,6-diketohexahydropyrimidine series, and Z and $Z_1$ each represents the nonmetallic atoms necessary to complete a heterocyclic nucleus of the benzoxazole series.

9. A photographic gelatino-silver halide emulsion sensitized with a merocyanine dye selected from those represented by the following general formula:

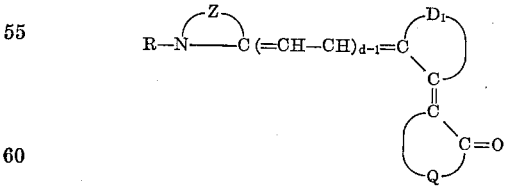

wherein R represents an alkyl group containing from 1 to 4 carbon atoms, $d$ represents a positive integer of from 1 to 3, $D_1$ represents the atoms necessary to complete a ring selected from the class consisting of an indan ring and a 1,2,3,4-tetrahydronaphthalene ring, Q represents the non-metallic atoms necessary to complete a heterocyclic nucleus selected from the class consisting of those of the pyrazolone series, those of the rhodanine series, those of the 2-thiohydantoin series, those of the 2-thio-2,4-oxazolidinedione series, those of the 2,4,6-triketohexahydropyrimidine series and those of the 2-thio-4,6-diketohexahydropyrimidine series and Z represents the non-metallic atoms necessary to complete the heterocyclic nucleus of the benzothiazole series.

10. A photographic gelatino-silver-halide emulsion sensitized with a merocyanine dye selected from those represented by the following general formula:

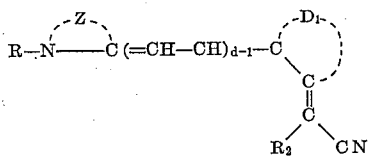

wherein R represents an alkyl group containing from 1 to 4 carbon atoms, $R_2$ represents a member selected from the class consisting of a cyano group and an alkoxycarbonyl group containing from 2 to 3 carbon atoms, $d$ represents a positive integer of from 1 to 3, $D_1$ represents the atoms necessary to complete a ring selected from the class consisting of an indan ring and a 1,2,3,4-tetrahydronaphthalene ring, and Z represents the non-metallic atoms necessary to complete a heterocyclic nucleus of the benzothiazole series.

11. A photographic silver halide emulsion sensitized with a dye represented by the following formula:

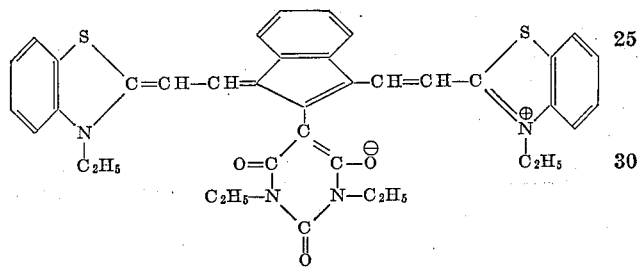

12. A photographic silver halide emulsion sensitized with a dye represented by the following formula:

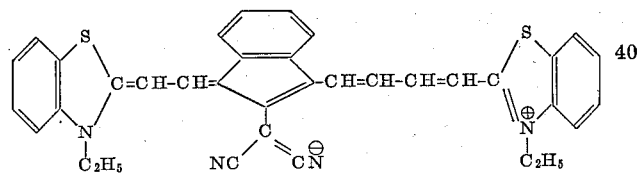

13. A photographic silver halide emulsion sensitized with a dye represented by the following formula:

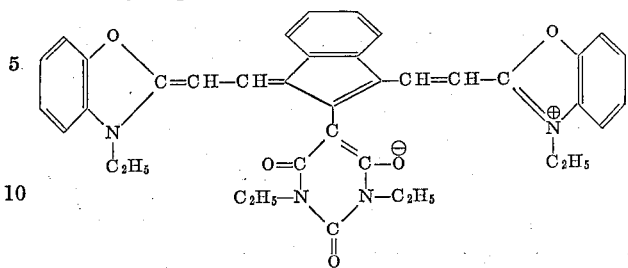

14. A photographic silver halide emulsion sensitized with a dye represented by the following formula:

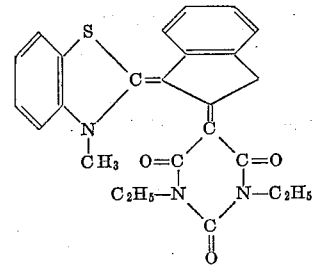

15. A photographic silver halide emulsion sensitized with a dye represented by the following formula:

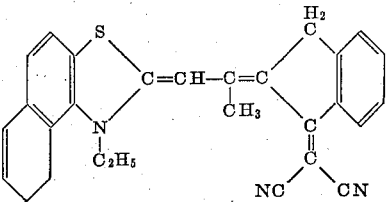

No references cited.

NORMAN G. TORCHIN, *Primary Examiner.*

J. T. BROWN, *Assistant Examiner.*

PO-1050
(5/69)

UNITED STATES PATENT OFFICE
CERTIFICATE OF CORRECTION

Patent No. 3,253,925           Dated May 31, 1966

Inventor(s)  Leslie G.S. Brooker and Frank G. Webster

It is certified that error appears in the above-identified patent and that said Letters Patent are hereby corrected as shown below:

Column 15, lines 4-9, in the structural formula, that part of the formula that reads

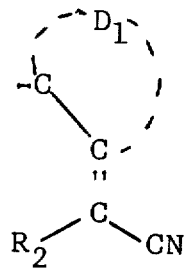   should read

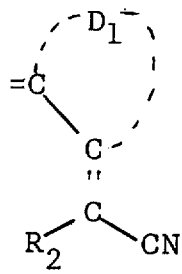

SIGNED AND
SEALED

DEC 23 1969

(SEAL)
Attest:

Edward M. Fletcher, Jr.
Attesting Officer

WILLIAM E. SCHUYLER, JR.
Commissioner of Patents